UNITED STATES PATENT OFFICE.

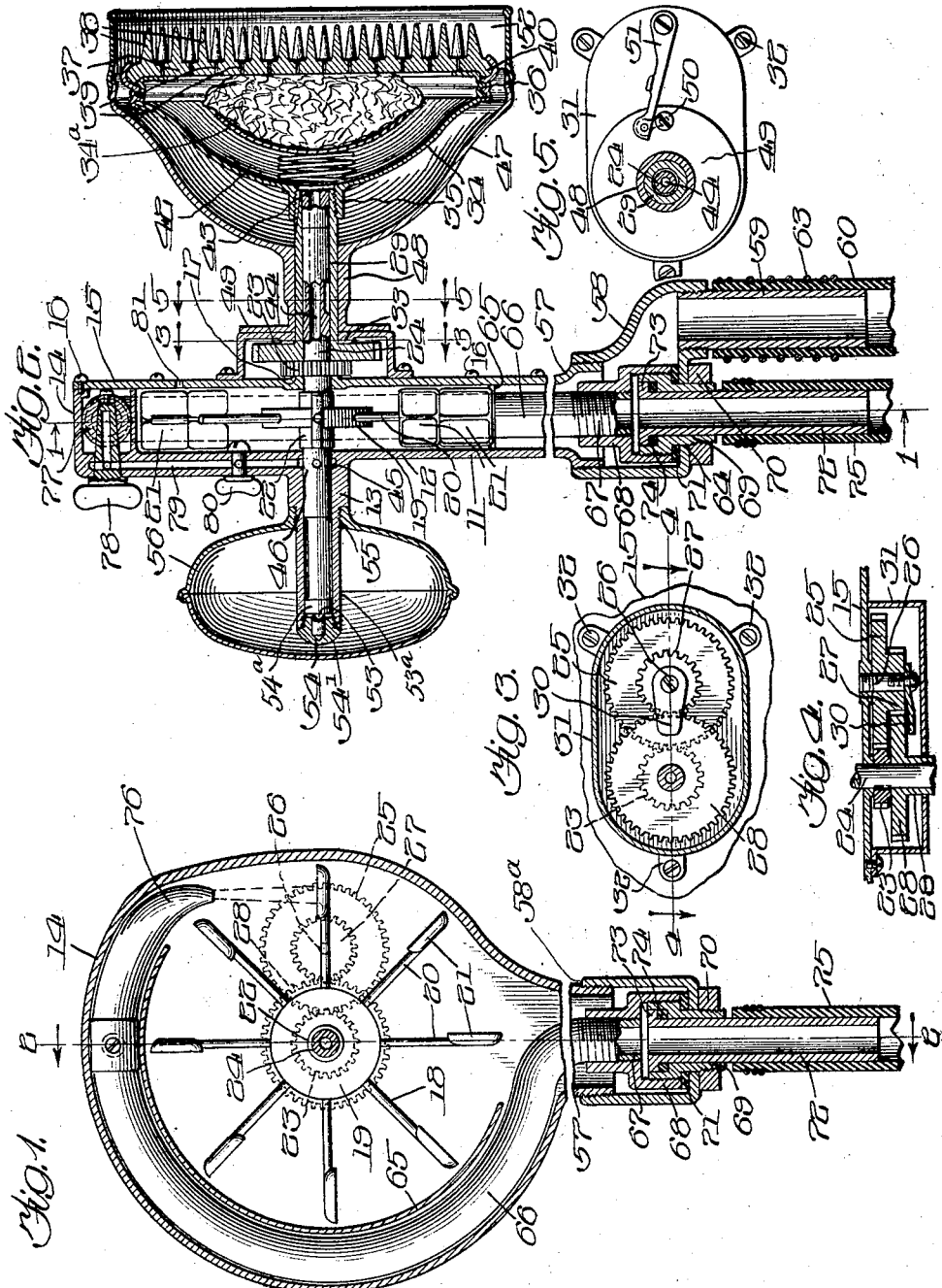

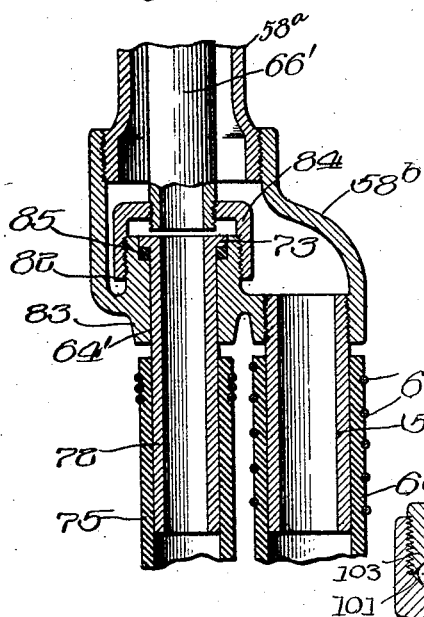
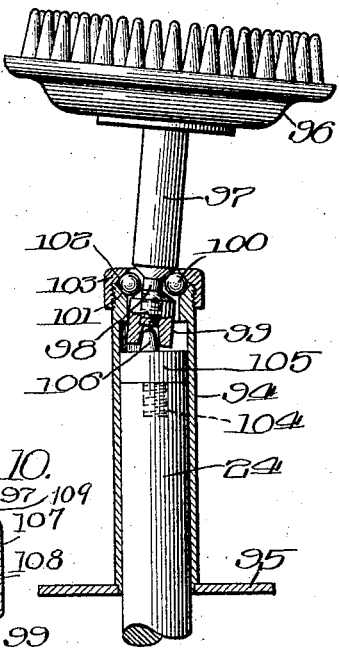
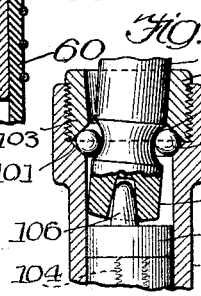
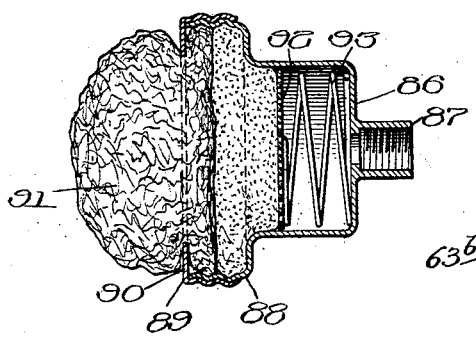
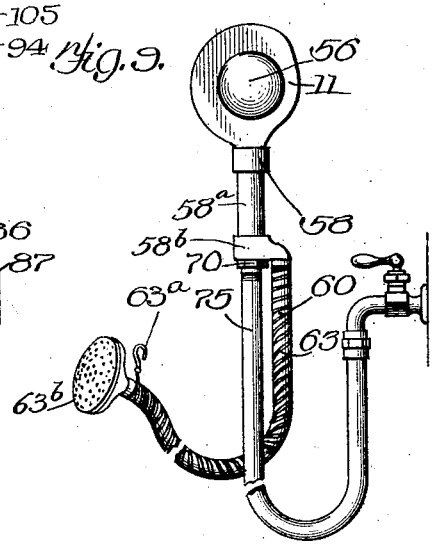

CLARENCE H. HAPGOOD, OF TOLEDO, OHIO, ASSIGNOR OF ONE-HALF TO MAXIM A. DUQUETTE, OF TOLEDO, OHIO.

TOILET APPARATUS.

1,305,358.  Specification of Letters Patent.  Patented June 3, 1919.

Application filed July 25, 1912, Serial No. 711,507. Renewed October 23, 1918. Serial No. 259,453.

*To all whom it may concern:*

Be it known that I, CLARENCE H. HAPGOOD, a citizen of the United States, residing at Toledo, in the county of Lucas and State of Ohio, have invented certain new and useful Improvements in Toilet Apparatus, of which the following is a specification.

My invention relates more particularly to a device adapted for treating the skin either by washing, rubbing, massaging or working the same, and comprising a motor and a working head or attachment adapted to spray and rub the body, but as will be apparent from the following description, the device is adapted to a great variety of uses in which rotary or vibratory movements are to be given a portable tool. For the purpose of exemplification, however, I have hereinafter described a preferred embodiment of my invention in the form in which it is adapted for use as a bathing device, disclosing at the same time certain attachments and constructions by which to convert the implement into a massage device. It will be understood, however, that my invention is not limited to the specific embodiment shown or uses disclosed but includes such modifications and equivalents thereof as come within the scope of the following claims.

Referring now to the accompanying drawings forming a part of the application, Figure 1 is a section through the device upon the plane of the line 1—1 of Fig. 2; Fig. 2 is a section substantially upon the plane of the line 2—2 of Fig. 1, perpendicular to the plane of the latter figure, certain parts, however, being shown in elevation; Fig. 3 is a section upon the line 3—3 of Fig. 2 looking in the direction of the arrows; Fig. 4 is a section upon the line 4—4 of Fig. 3; Fig. 5 is a section upon the line 5—5 of Fig. 2 also looking in the direction of the arrows; Fig. 6 is a section on a somewhat enlarged scale representing a modification of a detail to be described later; Fig. 7 is a central section of a modified form of attachment or working head used for bathing purposes; Fig. 8 is an elevation partly in section of a massage attachment showing the manner of connection to the operating part of the apparatus; Fig. 9 is an elevation of the device showing the attachments and Fig. 10 is a cross section of a detail to be described later.

Referring now more particularly to Figs. 1 to 5 inclusive it will be seen that the tool consists essentially of a casing in which is mounted a rotary motor to which is connected the head or attachment to be driven thereby, the casing being further provided with inlet and outlet openings for the supply and exhaust of the motive fluid which in this instance is water. The casing consists of a casting 11 which, as shown, is generally circular in form and provided at about the center of its plane wall with a perforated boss 13 which forms one of the bearings for the shaft upon which the rotary member of the motor is mounted. The annular wall 14 of the casing is integral with the plane wall, and a detachable cover or face plate 15 is screwed as at 16 to the annular wall or flange 14 and completes the inclosure for the motor. The cover plate 15 is also provided with a slight boss 17 opposite the boss 13 and perforated to form a longer bearing for the spindle of the motor. The latter, in the present instance, takes the form of a Pelton wheel 18 comprising a central hub or disk 19, a series of arms 20, each provided with a bucket 21 of a double concave form common in such motors and shown in Figs. 1 and 2 of the drawings, and a shaft or spindle 22, the last named element being reduced at its ends and turned to fit the bearings in the bosses 13 and 17 respectively. Outside the boss 17 a gear 23 is splined or otherwise secured upon the reduced end of the motor spindle or shaft, and engages a larger gear 25 which is mounted upon a stud 26 carried by the wall or face plate 15 (see Figs. 3 and 4). The gear 25 is revoluble upon stud 26 and carries with it a gear 27 of a lesser diameter, which in turn meshes with a gear 28 of a diameter equal to that of gear 25 and formed with a hollow spindle or sleeve 29 which is journaled upon the spindle 24 of the motor wheel. The outer end of the sleeve 29 is exteriorly screw-threaded for connection to the attachment or head which it is intended to revolve. The gearing just described is for the purpose of reducing the speed and increasing the power between the motor or wheel and the attachment which it operates. Upon the outer end of the stud shaft 26 is secured a finger 30 which not only holds the gears 25 and 27 in place but extends over and limits the longitudinal movement of gear 28 and sleeve 29 on the wheel spindle 24. The housing 31, secured by screws 32 to the cover plate 15 incloses the gearing and is formed with an inwardly extending perforated boss 33 which constitutes an exterior bearing for the sleeve 29.

The attachment, shown in Fig. 2 as operated by the motor, consists of a rose or sprinkling head, the cupped member 34 of which is provided with an interiorly threaded boss 35 for engagement with the sleeve 29 above described and formed at its outer periphery with a screw-thread and inwardly directed flange as plainly shown in Fig. 2. The front wall of the rose or sprinkling head consists of a circular perforated sheet of rubber or other suitable flexible material having rubbing fingers 38 upon the outer face thereof and secured to the cupped member by a threaded annulus 36 which is provided with an overhanging lip for engaging the edge 40 of the flexible disk. A follower 34$^a$ is pressed toward the perforated disk by a spring 42 and is adapted to yieldingly hold a body of soap between its concave surface and the inner wall of the flexible disk. The soap is preferably provided in fragmentary or granulated form and while held in position by the follower is gradually dissolved by the water forced against it and the follower plate has the further function in addition to holding the soap that it spreads the current of water and diverts its toward the periphery of the rose or spraying head. Water is supplied to the soap cup of the rose through a bore 44 in the spindle of the motor, which bore connects by perforations 45 with an annular channel or groove 46 in the bearing for the spindle of the motor (see Fig. 2).

In order to prevent splashing of the water from the rose, the latter is surrounded by a stationary cup or guard 47 which is formed with a neck 48 surrounding the sleeve 29 on which the rose is mounted, and provided with a plane flange 49. The latter abuts against the outer face of the housing 31 and is secured thereto by a stud 50 projecting from said housing through an opening in said flange and provided with a lateral kerf engaged by a swinging latch 51 pivoted to the housing for locking the guard in place (see Fig. 5). The outer edge of the stationary cup 47 is provided with a flexible resilient apron 52 which normally projects beyond the face of the rose but may be forced back by pressure when the device is applied to the surface to be cleaned.

The boss 13 is extended into a reduced sleeve 53$^a$ to form an elongated bearing for the end 54$^a$ of the wheel spindle or shaft and threaded at 55 for the attachment of a knob or handle 56 to facilitate the handling of the device. In order to meet or resist the end thrust upon the spindle of the motor caused by the action of the water fed through the hollow spindle thereof, the oppositely extending portion of the spindle is provided on its end with a cone bearing 53, preferably hardened, which engages a hardened block 54 of steel or other suitable material contained in a chamber in the screw plug 54'.

The casing 11 is formed at 57 with a hollow boss which communicates with the interior thereof, and a coupling 58 connects said boss with a short pipe section 58$^a$. Upon the opposite end of the latter a union 58$^b$ is secured and provided at 59 with a nipple upon which is secured a flexible exhaust tube 60 of rubber or other suitable material, (see Fig. 2). In order to prevent the collapse of this tube, it is surrounded by a helix of wire 63, which near the free end of the tube is attached to a hook 63$^a$ by which it may be secured to the screen or strainer over the outlet of a bathtub or other suitable water waste, see Fig. 9. A rose 63$^b$ may be secured to the end of the exhaust for rinsing purposes, if desired.

The union 58$^b$ is formed with an additional opening 64 in axial alinement with the opening by which the union is attached to the section 58$^a$, and through this opening extends the supply conduit for furnishing water for revolving the wheel or motor and also supplying the rose. Within the casing 11 is a semi-circular flange 65 forming a channel with the annular wall of the casing within which channel is anchored the supply conduit 66. The latter extends through coupling 58 and section 58$^a$ and is threaded at its end 67 and connected to a coupling member 68, in which is threaded a sleeve 69, which projects through the opening 64 in union 58$^b$ and is provided on the outer face thereof with a nut 70 whereby the packing 71 may be compressed to make a water-tight joint. Within the sleeve 69 is swiveled a nipple 72, which is flanged at its inner end 73, and packed with reference to the sleeve 69 at 74. To the outer end of the nipple 72 is secured the flexible supply pipe 75 whereby water is led to the conduit 66, it being clear that by reason of the swiveling of the end of the supply pipe its entanglement with the exhaust pipe 60 may be largely prevented, and handling of the device facilitated.

The conduit 66 terminates at its other end in a reduced nozzle 76 by which the water is directed against the buckets of the Pelton wheel above described, and at an intermediate point in the conduit it is counterbored as at 77, the bore receiving a hollow turning plug 78, which also extends through a channel 79 formed in the wall of the casing and communicating with the channel 46 in the bearing of the motor spindle, whereby water is furnished to the bore in the spindle. The cross channels or connections in the turning plug 78 are formed as usual to permit the flow of water to be adjustably controlled and if desired an additional turning plug 80 may be used to shut off entirely the supply of water to the spindle of the motor when for example, the tool or attachment being used does not require a water supply. At 81 in Fig. 2 I have indicated a vent for supplying air to the interior of the casing since I have found that there is a tendency to create a vacuum within the casing due to the flow of water which is made irregular thereby unless the vacuum is relieved.

The operation of the device has been substantially described in connection with the construction but it may be briefly reviewed as follows: When it is desired to use the instrument with the rose attachment the shield 47 is first secured in place by the means described and then the rose screwed upon the sleeve 29 having first been filled with soap preferably in the form of coarse granules. The filling operation is performed by removing the flexible disk from the cup, the threaded annulus being removed for this purpose.

With the parts in position as shown in Figs. 1 and 2, the plugs 78 and 80 turned to permit the flow of water to the rose, the supply pipe secured to the faucet by suitable connection and the exhaust pipe arranged to discharge into a wasteway, when the water is turned on it enters the conduit 26 and divides at the plug 78, part of the stream continuing on to drive the wheel by impact with the buckets thereof and the other portion being diverted and entering the hollow spindle of the wheel, flowing thence into and through the soap cup of the rose. The shield or disk 42, interposed between the soap and the end of the supply conduit, diverts the water toward the periphery of the cup thus preventing it from forcing a direct axial channel through the soap in the cup. The water takes up a suitable amount of soap in its passage through the soap cup and issues in a number of fine streams between the fingers upon the flexible disk and the latter provide the necessary friction or rubbing, it only being necessary for the users to move the tool over the surface of the body to be treated. When the pressure of the water is comparatively great the soap is correspondingly agitated by the spring-pressed plate and the amount of lather proportionately increased. With the ordinary pressure found in the city and town mains, a very small motor is sufficient to produce all the power necessary to drive the rose at the required speed, so that my tool provides a motor-driven bathing and scrubbing apparatus which is available in the ordinary city or town house without appreciable cost for the motive power since the amount of water required to drive the motor is practically negligible.

In Fig. 6, I have shown a modification of the means for swiveling the supply pipes which will be readily understood. The union 58' is attached to the short section 58ª as in the previously described modification and the connection to the exhaust tube 60 is likewise the same. The opening 64' through which the nipple 72 for the supply pipe extends, however, is provided with internal and external bosses 82—83 forming an elongated bearing for said nipple and the conduit 66' is connected to the boss 82 by a reducing union 84 as shown. The nipple 72 is flanged as in the previously described modification at its inner end and packed with relation to the boss 82 at 85. Except in the respects to which attention has been called the structure to which this modified form of coupling is applied is the same as that previously described.

As previously stated, Fig. 7 shows a modified form of attachment or head for bathing purposes. In this device, a casing 86 is screw-threaded at 87 for attachment to the sleeve 29 before described and threaded at its outer edge 88 for the reception of a cap member 89. The latter comprises a threaded flange and a plane face portion or annulus 90 through which projects a sponge 91. When the cap is screwed into position the sponge extends within the casing to some distance but between the inner face of the sponge and the rear wall of the casing is a space which is preferably filled with soap in granular form which is fed forward against the sponge as shown by a follower 92 and spring 93. The operation of this form of the device will be understood from the description of the operation of the other form, the water being forced by the pressure through the soap and sponge and the head revolved in contact with the surface to be cleaned.

When the instrument is to be used for massage purposes, I employ the attachment shown in Fig. 8. The shield 47 and rose are dispensed with and in their stead the sleeve 94 is secured upon the housing 31 by means of the flange 95 and surrounds the sleeve 29 as shown. The massage head 96 may be of any of the usual or desirable types and is formed with the spindle 97 which is reduced and screw-threaded at 98 for the reception of a sleeve 99. The adjacent shoulders upon the spindle 97 and sleeve 99 are hardened to form bearings for the balls 100 which run in a channel formed by a shoulder 101 upon the end of the sleeve 94 and a shoulder 102 formed upon a threaded cap 103 screwed upon the outer end of said sleeve.

As an alternative for the bearing just described I may employ the bearing shown in Fig. 10 in which the stem or spindle of the massage head is formed integral throughout with an intermediate ball race 107, the outer ball race being formed in part upon an internal shoulder 108 upon the sleeve and in part upon an exteriorly-threaded annulus or gland 109 screwed into the interiorly-threaded outer end of the sleeve.

In the case of the massage attachment, motion is not transmitted through the gear 28 and sleeve 29 but directly from the spindle 24, the outer end of the bore of which is screw-threaded for the reception of a threaded spud 104 upon the connecting disk 105. The latter is provided upon its upper or outer face with an eccentric post or spud 106 which enters and engages the projecting end of the nut 99, the bore of which is left smooth and hardened for this purpose. When this attachment is used on the device, the water supply to the spindle of the rotary motor is shut off by means of the rotary valve above described but the wheel is rotated as before by the impact of the stream on the buckets. The connection of the massage head to the spindle of the motor is such that the former is not rotated but gives a vibratory or rapid wabbly motion as in other apparatus of this character.

I claim—

1. In a device of the class described, a casing, a rotary means journaled in the casing, a hollow boss communicating with the interior of the casing, flexible supply and exhaust pipes connected to said boss, there being a rigid connection between the exhaust pipe and said boss, and an independent swiveled connection between the supply pipe and said boss, and a conduit communicating with said connection for leading water from said supply pipe to said rotary means.

2. In a device of the class described, a casing, a rotary means journaled in the casing, a hollow boss communicating with the interior of the casing, a union attached to said boss having a pair of separate openings, a nipple secured in one opening, and a second nipple swiveled in the other opening, an exhaust pipe secured to the first said nipple, a supply pipe connected to the second said nipple and a conduit connected to the latter for leading water to said rotary means.

3. In a device of the class described, a casing, a water motor revolubly mounted therein, a hollow sleeve revolubly mounted concentric with said motor and adapted to receive on its end a revoluble rose, a train of reducing gears connecting said sleeve and motor, and supply conduits within the casing leading to the motor and sleeve respectively.

4. In a device of the class described, a hollow spindle, a conduit communicating with said spindle, a sleeve journaled upon said spindle and adapted to receive a rose and revoluble with relation to said spindle, and reducing gearing between said spindle and sleeve.

5. In a device of the class described, a casing, a water motor mounted therein and comprising an extended hollow spindle, a conduit communicating with said spindle, a sleeve mounted upon, communicating with, and revoluble upon the spindle and adapted to receive a working head, a gear upon the spindle, a gear upon the sleeve, and gearing intermediate said gears.

6. In a device of the class described, a casing, a revoluble motor mounted therein comprising a spindle 24, a sleeve 29 journaled upon the spindle and rotatable with relation thereto, a head 34 mounted upon the sleeve, gears 23 and 25 mounted upon the spindle and sleeve respectively, connections between said gears, a housing 31 inclosing said gearing, a shield 47 partially surrounding said head, and means for detachably connecting the shield to the housing.

7. In a device of the class described, a casing, a revoluble hydraulic motor therein having a hollow spindle, a sleeve mounted on said spindle and revoluble with respect thereto, gears on said sleeve and spindle respectively, other gears connecting the same, a rose on the sleeve, a supply conduit leading to the motor and a branch conduit leading therefrom to the hollow spindle.

8. In a device of the class described, a casing, a water motor inclosed within the casing, a rotary head driven thereby, means for securing a supply to the casing, an exhaust conduit leading from the casing and comprising a flexible tube having a wire surrounding the same and a hook secured to the end of the wire.

9. In a device of the class described, a water motor, a casing inclosing the same, a union on the casing having a swiveled and a rigid nipple for attaching thereto a supply tube and an exhaust tube, and an exhaust tube connected to one of said means and a rose upon the outer end of the exhaust tube.

10. In a device of the class described, a casing, a union communicating with the interior of the casing and having a nipple rigid therewith, and a second nipple swiveled with relation thereto, a conduit leading from said swiveled nipple and adapted to discharge at its end into the casing, a rotary means journaled within the casing and adapted to receive the stream of water which thereby transmits motion to said means, a hollow spindle upon which said rotary means is mounted, a branch conduit communicating with the supply conduit and with the interior of said spindle, a sleeve adapted to receive a rose upon its outer end and having a gear on its inner end, gearing connecting said gear with said spindle, and an exhaust pipe communicating with said union.

CLARENCE H. HAPGOOD.

Witnesses:
M. A. DORQUETTE,
BERYL L. BOYER.

Copies of this patent may be obtained for five cents each, by addressing the "Commissioner of Patents, Washington, D. C."